United States Patent
Odegard (10) Patent No.: US 12,515,886 B2
(45) Date of Patent: Jan. 6, 2026

(54) PROCESSING LINE WITH FEED FORWARD DATA BACKLOG CONTROL AND METHOD

(71) Applicant: BW Converting, Inc., Green Bay, WI (US)

(72) Inventor: John C. Odegard, Green Bay, WI (US)

(73) Assignee: BW Converting, Inc., Green Bay, WI (US)

(*) Notice: Subject to any disclaimer, the term of this patent is extended or adjusted under 35 U.S.C. 154(b) by 510 days.

(21) Appl. No.: 18/112,113

(22) Filed: Feb. 21, 2023

(65) Prior Publication Data

US 2023/0195083 A1  Jun. 22, 2023

Related U.S. Application Data

(63) Continuation-in-part of application No. 17/026,409, filed on Sep. 21, 2020, now abandoned.

(Continued)

(51) Int. Cl.
*G05B 19/418* (2006.01)
*B65B 57/16* (2006.01)
(Continued)

(52) U.S. Cl.
CPC .............. *B65G 43/08* (2013.01); *B65B 57/16* (2013.01); *B65G 15/30* (2013.01); *G05B 19/418* (2013.01);
(Continued)

(58) Field of Classification Search
CPC ............ B65G 43/08; B65G 15/30; B65G 2203/0208; B65G 2203/0225;
(Continued)

(56) References Cited

U.S. PATENT DOCUMENTS

| 4,135,346 | A | * | 1/1979 | Rebsamen | ............... | B65B 57/16 |
| | | | | | | 198/572 |
| 4,394,896 | A | * | 7/1983 | McComas | ............... | B65B 57/16 |
| | | | | | | 198/572 |

(Continued)

FOREIGN PATENT DOCUMENTS

| CA | 2789723 A1 | 3/2013 |
| EP | 1513754 B1 | 11/2007 |

(Continued)

OTHER PUBLICATIONS

International Search Report and Written Opinion for PCT/US2020/020348 dated May 11, 2020.

(Continued)

*Primary Examiner* — Thomas Randazzo
(74) *Attorney, Agent, or Firm* — Thompson Coburn LLP (57) ABSTRACT

A processing line includes a conveyor for conveying product from upstream processing equipment to downstream processing equipment. Data structures stored in a memory of a controller comprise a backlog set point for a product type to be processed. A product sensor for the conveyor is enabled to generate signals representative of a number of the products moving on the conveyor from the upstream processing equipment for delivery to the downstream processing equipment. A conveyor speed sensor for the conveyor is enabled to generate signals representative of a speed of the conveyor. A backlog measurement based upon the product sensor signals and the conveyor speed sensor signals is determined. The backlog measurement is compared to the backlog set point to determine a difference in backlog. The controller is enabled to generate signals for controlling the processing line based upon the difference in backlog and additional information related to the product type.

24 Claims, 7 Drawing Sheets

Related U.S. Application Data (60) Provisional application No. 62/907,783, filed on Sep. 30, 2019.

(51) Int. Cl.
  *B65G 15/30*  (2006.01)
  *B65G 43/08*  (2006.01)

(52) U.S. Cl.
  CPC ..... *G05B 19/4183* (2013.01); *G05B 19/4189* (2013.01); *B65G 2203/0208* (2013.01); *B65G 2203/0225* (2013.01); *B65G 2811/095* (2013.01); *G05B 2219/39102* (2013.01)

(58) Field of Classification Search
  CPC .............. B65G 2811/095; B65B 57/16; G05B 19/4182; G05B 19/4183; G05B 19/4189; G05B 2219/39102; G05B 19/41815; Y02P 90/02
  See application file for complete search history.

(56) References Cited

U.S. PATENT DOCUMENTS

| | | | | |
|---|---|---|---|---|
| 4,729,105 | A * | 3/1988 | Thompson | B65G 43/08 |
| | | | | 198/572 |
| 6,131,372 | A * | 10/2000 | Pruett | B65B 23/12 |
| | | | | 53/448 |
| 6,755,940 | B2 | 6/2004 | Lin et al. | |
| 7,000,864 | B2 | 2/2006 | McNeil et al. | |
| 7,017,321 | B2 * | 3/2006 | Salvoni | B65B 43/52 |
| | | | | 53/76 |
| 9,845,574 | B2 | 12/2017 | Bomstad et al. | |
| 10,227,197 | B2 | 3/2019 | DeBruler et al. | |
| 2007/0129843 | A1 * | 6/2007 | Lupton | B65G 47/70 |
| | | | | 700/223 |
| 2007/0144868 | A1 * | 6/2007 | Zeitler | B65G 43/10 |
| | | | | 198/572 |
| 2009/0250312 | A1 * | 10/2009 | Meisinger | B65G 43/08 |
| | | | | 198/419.2 |
| 2017/0327337 | A1 | 11/2017 | Bixler et al. | |
| 2018/0008104 | A1 | 1/2018 | Becker et al. | |
| 2018/0339865 | A1 * | 11/2018 | Schroader | G06V 20/52 |
| 2019/0031452 | A1 * | 1/2019 | Koga | B65G 47/905 |
| 2019/0048526 | A1 | 2/2019 | Kettunen et al. | |
| 2019/0301099 | A1 | 10/2019 | Montagnani et al. | |
| 2020/0109011 | A1 * | 4/2020 | Fourney | B65G 47/31 |
| 2022/0342401 | A1 | 10/2022 | Dunigan | |

FOREIGN PATENT DOCUMENTS

| | | |
|---|---|---|
| WO | 2009029017 A9 | 2/2010 |
| WO | 2018011033 A1 | 1/2018 |
| WO | 2018236389 A1 | 12/2018 |
| WO | 2019185438 A1 | 10/2019 |
| WO | 2019244182 A1 | 12/2019 |
| WO | 2019244183 A1 | 12/2019 |
| WO | 2021067055 A1 | 4/2021 |

OTHER PUBLICATIONS

International Search Report and Written Opinion for PCT/US2020/051757 dated Dec. 18, 2020.

* cited by examiner

| Multidimensional Array Example of Data for Feed Forward Model Based Backlog Control | | | | | |
|---|---|---|---|---|---|
| Index / Tag | Roll Present [BOOL] | Rate [REAL] | Diameter [REAL] | Parent Reel [REAL] | Defect [DINT] |
| Conveyor | | | | | |
| Conveyor[0] | 0 | 0 | 0 | 0 | 0 |
| Conveyor[1] | 1 | 130 | 135 | 13425 | 0 |
| Conveyor[2] | 0 | 0 | 0 | 0 | 0 |
| Conveyor[3] | 0 | 0 | 0 | 0 | 0 |
| Conveyor[4] | 1 | 130 | 135 | 13425 | 0 |
| Conveyor[5] | 0 | 0 | 0 | 0 | 0 |
| Conveyor[6] | 0 | 0 | 0 | 0 | 0 |
| Conveyor[7] | 1 | 130 | 135 | 13425 | 1 |
| Conveyor[8] | 0 | 0 | 0 | 0 | 0 |
| Conveyor[9] | 0 | 0 | 0 | 0 | 0 |
| Conveyor[10] | 1 | 200 | 135 | 13425 | 0 |
| Conveyor[11] | 0 | 0 | 0 | 0 | 0 |
| Conveyor[12] | 1 | 200 | 134 | 13425 | 0 |
| Conveyor[13] | 0 | 0 | 0 | 0 | 0 |
| Conveyor[14] | 1 | 200 | 134 | 13425 | 3 |
| Conveyor[15] | 0 | 0 | 0 | 0 | 0 |
| Conveyor[16] | 1 | 200 | 134 | 13424 | 0 |
| Conveyor[17] | 1 | 200 | 134 | 13424 | 0 |
| Conveyor[18] | 1 | 200 | 134 | 13424 | 0 |
| Conveyor[19] | 1 | 200 | 134 | 13424 | 0 |

Fig. 6

| UDT Example | | |
|---|---|---|
| UDT_RollData | | |
| | Roll | |
| | Rate | |
| | Diameter | |
| | ParentReel | |
| | Defect | |

| Array Example Using UDT | | | |
|---|---|---|---|
| Index / Tag / Member | | Value | Type |
| Conveyor | | | UDT_RollData[5] |
| Conveyor[0] | | | UDT_RollData |
| | Roll | 1 | BOOL |
| | Rate | 130 | REAL |
| | Diameter | 135 | REAL |
| | ParentReel | 13425 | REAL |
| | Defect | 0 | DINT |
| Conveyor[1] | | | UDT_RollData |
| | Roll | 0 | BOOL |
| | Rate | 0 | REAL |
| | Diameter | 0 | REAL |
| | ParentReel | 0 | REAL |
| | Defect | 0 | DINT |
| Conveyor[2] | | | UDT_RollData |
| | Roll | 1 | BOOL |
| | Rate | 200 | REAL |
| | Diameter | 135 | REAL |
| | ParentReel | 13424 | REAL |
| | Defect | 0 | DINT |
| Conveyor[3] | | | UDT_RollData |
| | Roll | 1 | BOOL |
| | Rate | 20 | REAL |
| | Diameter | 134 | REAL |
| | ParentReel | 13424 | REAL |
| | Defect | 1 | DINT |
| Conveyor[4] | | | UDT_RollData |
| | Roll | 1 | BOOL |
| | Rate | 200 | REAL |
| | Diameter | 134 | REAL |
| | ParentReel | 13424 | REAL |
| | Defect | 0 | DINT |

Fig. 7

PROCESSING LINE WITH FEED FORWARD DATA BACKLOG CONTROL AND METHOD

RELATED APPLICATION DATA

This application is a continuation-in-part application of U.S. application Ser. No. 17/026,409, filed Sep. 21, 2020, which claims the benefit of U.S. provisional application Ser. No. 62/907,783, filed Sep. 30, 2019, the disclosures all of which are incorporated by reference herein.

BACKGROUND AND SUMMARY

One aspect of this disclosure is directed to a processing line with a model based speed and backlog control system. The control system is configured to control the speed of a machine based upon a desired backlog set point with a real-time calculation of the backlog before the machine as feedback for the control system. The control system eliminates discreet speed levels, which can cause fault-inducing jerky or start-stop operation, and results in smoother speed operation for the processing line. The control system allows the processing line to operate efficiently by automatically balancing the line and machine speeds without interaction from an operator, which frees up an operator for other tasks.

As will be described in greater detail below, the machines in the processing line may be set for their maximum and minimum speeds, and the control system may be set with a desired backlog level. The desired backlog level may be based upon the optimum backlog to ensure proper infeed into a machine and transfer between a conveyor and one or more machines, and may include factors as product weight, and product accumulation levels for a machine. The desired level may also consider the stopping time and amount of product consumed while stopping a machine to ensure enough accumulated product exists to stop the machine in a desired manner and at a desired point in the machine cycle. This can be done to ensure machines start up reliably after the stop. This will often define the minimum amount of product backlog required. The control system is configured to balance backlog levels automatically by adjusting speeds based on current running conditions and a backlog set point. This generally removes operator interaction and balances the processing line for continuous, smooth operation by reducing the starts and stops that would result from less integrated solutions relying only on traditional photo electric eye control systems. This method allows for shorter lengths of conveyor, resulting in less overall space occupied by the processing line.

In one application, the control system utilizes a real time model of the product flow on a conveyor system. The position of every roll or package on the conveyor is determined by the control system along with the accumulation or backlog level. The accumulation level upstream on the conveyor and downstream on the conveyor is used to control the speed of one or more machines. Each machine may then be controlled to run at any speed in its speed range, proportional to the accumulation or backlog levels.

To better control accumulation and backlog level, the control system includes a controller that is configured to target a specific backlog level. In particular, the controller is configured to generate control signals for machines in the processing line based upon a backlog set point with a modeled backlog level providing feedback to the controller. In one aspect, the controller includes a PID control with the desired backlog level as the set-point and the modeled backlog level as the feedback for the PID control. The output of the PID control is configured to control the speed of a machine in the processing line. The control system allows the backlog level to stay close to the backlog set point during steady state operation regardless of the speed of the conveyor or the rate at which product is being sent to the machine.

Another aspect of the disclosure is a control system based on a feed forward control for the downstream processing equipment. The control system is configured to enable the creation of a multi-dimensional array or user-defined type with additional information for each product that is simulated on the conveyor. A portion of the data included in the multi-dimensionsal array or user-defined type includes the speed or rate at which the product is being processed on upstream processing equipment. The multi-dimensionsal array or user-defined type may include other data useful in the control and operation of the converting line. The control can be configured to control the downstream processing equipment based on the multi-dimensionsal array or user-defined type so that the rate of processing of the product in the downstream processing equipment matches the rate of processing of the product in the upstream processing equipment. In this aspect of the disclosure, minimal lengths of conveyor are needed because the feedforward control tightens the feedback loop and lessens the extent to which the PID control is needed, since the speed of the downsteam machines more closely match the speed of the product being delivered to them with minimal to no additional product accumulation.

DETAILED DESCRIPTION

Figure 1:
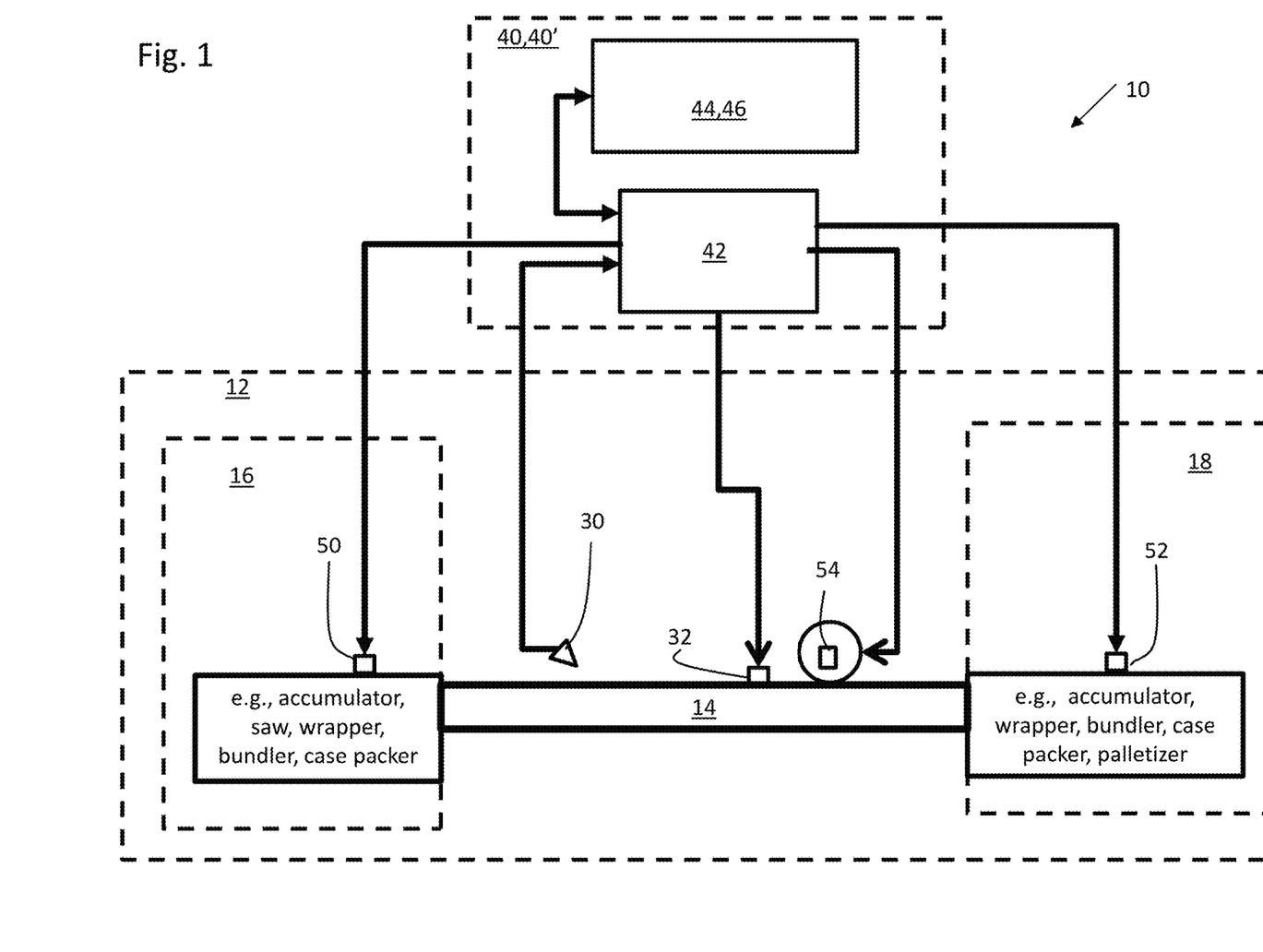
FIG. 1 is an exemplary schematic diagram of the processing line and control system utilizing a model based speed and backlog control.

FIG. 1 shows an exemplary schematic diagram of the processing line and control system 10 utilizing a model based speed and backlog control. The exemplary control system 10 is described as being implemented on a processing line 12 having a conveyor 14 that is adapted and configured to convey product from upstream processing equipment 16 upstream of the conveyor to downstream processing equipment 18 downstream of the conveyor. However, it may be appreciated that the principles of the control system may be employed on other conveyor systems, for instance, an in-feed conveyor for a saw cutting operation or a conveyor disposed before or after an accumulator. For purposes of illustration and not in any limiting sense, in one aspect, the upstream processing equipment 16 may be a saw cutting operation. The saw cutting operation may be adapted and configured to cut logs of convolutely wound web material or ribbons of folded and stacked web material. In another aspect, the product conveyed on the conveyor 14 may be rolls of convolutely wound web material or rectangularly shaped stacks of folded and stacked web material. In another aspect, the downstream processing equipment 18 may be a wrapping station for wrapping a product, for instance, rolls of convolutely wound web material or rectangularly shaped stacks of folded and stacked web material. In another non-limiting example, the processing line 12 may be configured with a wrapping station as upstream processing equipment, and a bundler or a case packer as downstream processing equipment. In another non-limiting example, the processing line 12 may be configured with a bundler as upstream processing equipment 16, and a case packer or palletizer as downstream processing equipment 18. In another non-limiting example, the processing line may be configured with a case packer as upstream processing equipment 16, and a palletizer as downstream processing equipment 18.

In the exemplary implementation shown in FIGS. 1-4, the control system 10 includes a product sensor 30 for the conveyor 14. The product sensor 30 may be adapted and configured to generate signals representative of a number of the products moving on the conveyor 14 from the upstream processing equipment 16 past the product sensor to the downstream processing equipment 18. The product sensor 30 may be configured to generate signals representative of a product count and/or position of the product on the conveyor 14. By way of example and not in any limiting sense, the product sensor 30 may be a photoelectric eye, a camera, or an image capture device such as a CCD or CMOS device.

In the exemplary implementation shown in FIGS. 1-4, the control system 10 further includes a conveyor speed sensor 32 for the conveyor. The conveyor speed sensor 32 may be adapted and configured to generate signals representative of a speed of the conveyor 14. The conveyor speed sensor 32 may directly measure the speed of the conveyor 14 through optics or imaging of the conveyor or indirectly through signals developed by encoders or drives associated with motion components of the conveyor drive system.

In the exemplary implementation shown in FIGS. 1-4, the control system 10 further includes a controller 40 having a processor 42 and memory 44. The memory or a part thereof may be configured as a database 46. The memory 44 and database 46 may be resident on any one or more physical memories that can take the form of a non-transitory computer-readable storage medium. Such memory can be configured to store data structures representative of the profiles described herein as well as data structures representative of the programming instructions described herein. For example, the memory may take the form of RAM within a server and the memory for the database may take the form of a hard drive or the like within the server or accessible by the server. Further still, it should be understood that the database may be optionally distributed across multiple physical memories as a plurality of databases. It should be noted that the system described herein may be implemented in software and/or in a combination of software and hardware, e.g., using application specific integrated circuits (ASIC), a general purpose computer or any other hardware equivalents. Programming for the system and/or mobile device may be loaded into memory and executed by the processor to implement the functions discussed herein. As such, programming may be stored on a computer readable medium, e.g., RAM memory, magnetic or optical drive or diskette and the like. Illustrated are at least one processor coupled to memory. The processor 42 may be coupled to input/output devices, as will be described below. The memory stores instructions and data used by the processor. As is known in the art, the controller is adapted to execute computer programs for performing the functionality described herein. As used herein, the term "program" or "programming" refers to computer program logic utilized to provide the specified functionality. Thus, a program or programming may be implemented in hardware, firmware and/or software. A program or programming may be stored on the memory and executed by the processor. A program or programming may be loaded as part of client applications downloaded via the system.

In the exemplary implementation as shown in FIGS. 1-4, the processor 42 is coupled to the product sensor 30 and the conveyor speed sensor 32, which provides inputs to the controller 40, and at least one machine drive 50,52 or control system 54 which receives an output signal of the controller. In FIG. 1, the controller 40 is configured to provide output signals to a conveyor drive control 54 for controlling the operation of the conveyor (e.g., its speed, on, off), a saw operation 50 (e.g. saw conveyor lane operation, saw cut cycle time, on, off), and a wrapping station 52 (e.g., infeed belt conveyor speed, on, off). The programming of the controller 40 may include instructions to enable the presentation of several graphic user interfaces and may enable the operator to access several input/output programs associated with the controller, for instance, via a human-machine interface (HMI).

Figure 2:
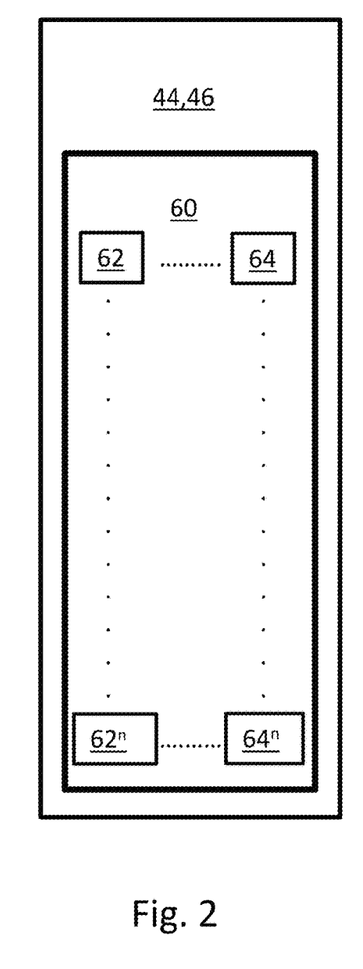
FIG. 2 is an exemplary schematic diagram of a database of a controller of the systems and data structures associated with the database.

Programming of the controller 40 may also be adapted and configured to process information representative of a backlog set point, a length of a conveyor, a range of backlog levels for upstream and downstream processing equipment, and the measured backlog. The programming of the controller 40 may include instructions to store a plurality of data structures 60 in the memory of the controller of the control system. By way of example, as shown in FIG. 2, the data structures 60 may include a plurality of data items associated together as the backlog set point 62 and the product type 64. The data structures may also include a range of backlog levels for upstream and downstream processing equipment 16,18 and a length of the conveyor 14.

Figure 3:
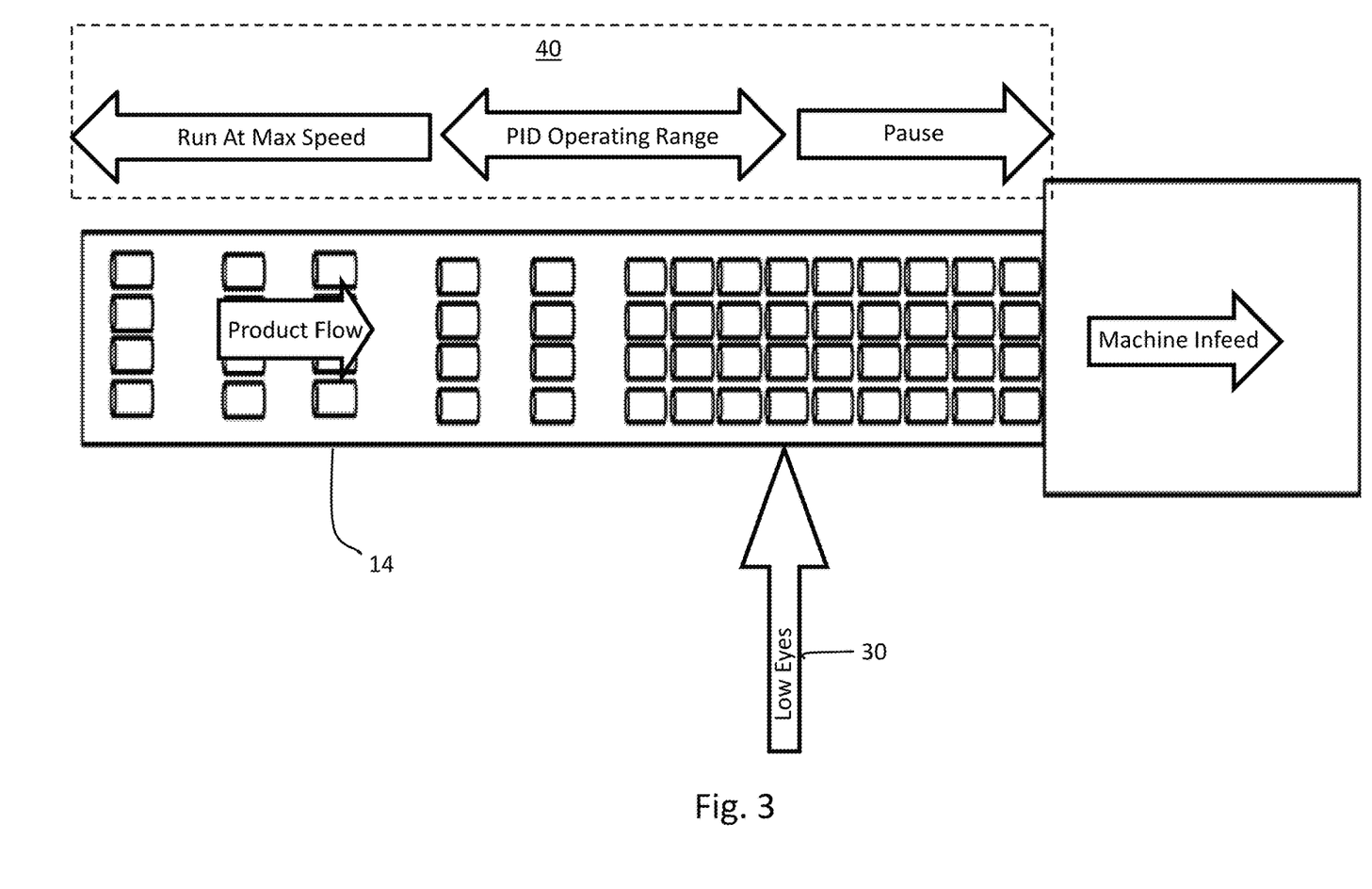
FIG. 3 is an exemplary schematic diagram showing a conveyor system with a backlog for a downstream machine and the range of speed for operating the conveyor.
Figure 4:
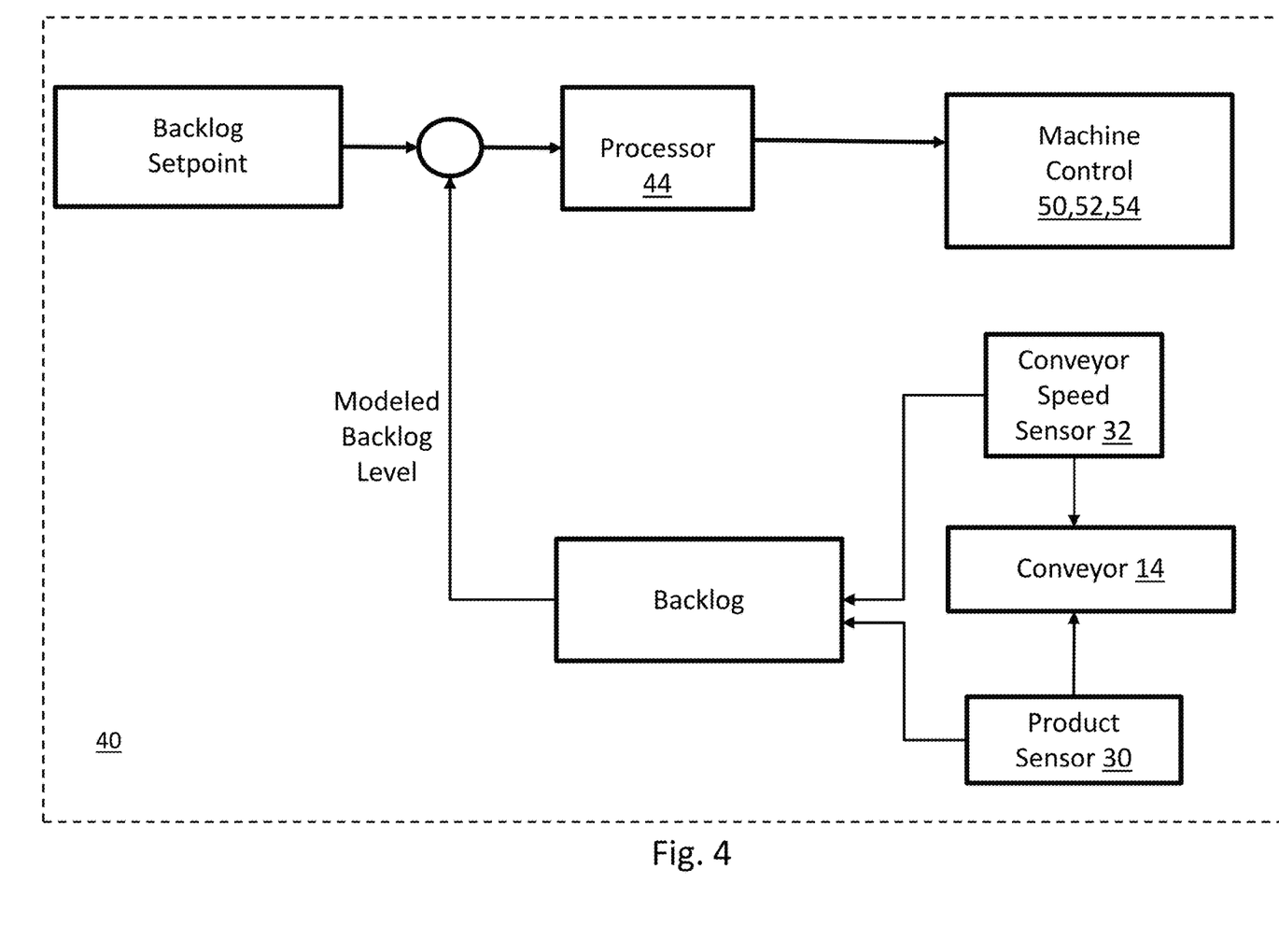
FIG. 4 is an exemplary schematic diagram showing data acquisition and process flow for the controller of the control system of the processing line.

Making reference to FIG. 3, the programming of the controller 40 may include instructions to determine a backlog measurement for the conveyor based upon the data structures generated using machine signals, sensor signals, conveyor speed signals, product dimensions, and conveyor length. The programming of the controller 40 may include instructions to compare the backlog measurement to the backlog set point to determine a difference in backlog. The programming of the controller 40 may include instructions to generate signals for controlling the processing line based upon the difference in backlog. The programming of the controller 40 may include instructions to generate a signal to change a speed of the conveyor 14 based upon the difference in backlog. In one example, the controller 40 may include instructions to generate a signal to change the speed of the conveyor 14 based on the amount of product modeled on a section of conveyor. For example, if the product sensor 30 senses that a section of the conveyor 14 is full of product, the controller 40 can be programmed with instructions to develop signals to change the speed of the conveyor to match the speed of the machine 52 the conveyor is feeding. Conversely, if the product sensor 30 senses that a section of the conveyor does not have any accumulated product, then the controller 40 can be programmed with instructions to develop signals to increase the speed of the conveyor 14 until the backlog matches the requirements for the machine the conveyor is feeding. The programming of the controller 40 may include instructions to generate a signal to change operation of the upstream processing equipment 16 based upon the difference in backlog. In one example and not in any limiting sense, the programming of the controller 40 may include instructions to generate signals for controlling operation of a saw cutting operation upstream of the conveyor based upon the difference in backlog. The programming of the controller 40 may include instructions to generate a signal to change operation of the downstream processing equipment 18 based upon the difference in backlog. In one example and not in any limiting sense, the programming of the controller 40 may include instructions to generate signals for controlling operation of a wrapping station downstream of the conveyor based upon the difference in backlog. The control signals may be directed to any/all of the machines in the processing line, for instance, as shown in FIG. 1.

The programming of the controller 40 may also include instructions to process information indicative of the product type 64. In one aspect, the programming of the controller 40 may include instructions to process information indicative of whether the product type is a cylindrical roll. The programming of the controller 40 may include instructions to process information indicative of an orientation of the product and/or a dimensional size of the product in the specified orientation. The programming of the controller 40 may include instructions to store a plurality of data structures in the memory that includes data representative of the orientation and/or dimensional size of the product. In one aspect, the dimensional information of the product may be representative of an axial length of the roll. In another aspect, the dimensional information of the product may be representative of a diameter of the roll. In another aspect, the programming of the controller 40 may include instructions to process information indicative of whether the product has a rectilinear or rectangular form. In another aspect, the dimensional information of the product type may be representative of a length of a side of the rectangular form.

With this information, the controller 40 may be enabled to generate signals indicative of backlog level on a real time basis which may then be used as a feedback signal for use in the controller to increase or decrease the speed of one or more machines in the processing line. In one aspect, for instance, as shown schematically in FIG. 4, the controller 40 may be programmed with a modeled backlog based upon the requirements of the machine which the conveyor is feeding. If the product sensor determines that the real-time backlog does not match the modeled backlog, the upstream machine 16, downstream machine 18, and/or conveyor 14 (e.g, conveyor speed) may be adjusted accordingly. By way of example, and not in any limiting sense, the modeled backlog may correspond or be representative of an array of products on a section of the conveyor adjacent the in-feed of a downstream machine. The array may correspond or be representative of product arranged side-to-side or end-to-end on the conveyor with no gaps between the products. For purposes of illustration, if a section of conveyor adjacent the in-feed of the downstream machine is 10 feet long and the rolls to be processed in the downstream machine are 4 inches long, the array would have a length of 30 elements. The width of the array would depend on the conveyor width. During operation, the product sensor 30 may be configured to sense the location of product on and/or the rate of delivery of product to the section of conveyor adjacent the in-feed of the downstream machine 18 and send corresponding signals to the controller 40. During operation, the conveyor speed sensor 32 may be configured to sense the speed of the conveyor 14 and send corresponding signals to the controller 40. Based upon the product sensor and the conveyor speed signals, and the dimension/orientation information of the product being processed, the controller 40 may be programmed with instructions to compare the rate of shift of the array with the rate of delivery of product to the section of conveyor adjacent the in-feed of the downstream machine 18. Based on differences, the controller 40 may be programmed to adjust the speed(s) of the upstream machine 16, the conveyor 14, and/or the downstream machine 18 accordingly. For example, if the conveyor speed sensor sends signals to the controller that conveyor is moving 100 feet/min, for a four inch product as described above, the array elements would be shifted every 0.2 seconds. The measurements of the rate of delivery of product to the top end of the array may be based on the product sensor 30 or a signal from the upstream machine 16 (e.g., the producing machine). The rate of removal of product from the bottom end of the array may be based on the product sensor 30 or signals from the downstream machine 18. The controller 40 may be enabled to determine that no shift has occurred if the products being delivered to the section of the conveyor adjacent the in-feed of the downstream machine 18 occupy successive elements in the array and otherwise match the modeled backlog. The controller 40 may be enabled to determine that a shift has occurred if the products being delivered to the section of the conveyor adjacent the in-feed of the downstream machine 18 do not occupy successive elements in the array or otherwise do not match the modeled backlog. Once a shift is detected, the programming of the controller 40 may include instructions to compare the real-time backlog rate to the machine and/or conveyor speeds and make adjustments taking into account a desired backlog level (e.g., backlog set point). For example, the downstream machine 18 may send signals to the controller 40 that it is operating in a manner such that a four inch product is being removed from the bottom of the array every 0.5 seconds. The conveyor speed sensor 32 may send signals to the controller 40 that the conveyor is moving at 100 feet/min, that is, the top end of the array is shifting every 0.2 seconds. The controller 40 may compare the removal rate at the downstream machine 18 to the backlog set point, and generate signals to the downstream machine 18 to increase the rate of removal and/or the upstream equipment 16 to slow the delivery of product to the top end of the array. The controller may be programmed to generate multiple signals to the upstream and downstream equipment (e.g., increasing the rate of removal by the downstream equipment and lowering the rate of delivery by the upstream equipment) to minimize drastic operational changes in the system. In cases where generating signals to the upstream and downstream equipment 16,18 does not result in the backlog level reaching the set point as quick as is desired, the controller may also be programmed to change the speed of the conveyor. For example, in a very short conveyor span it may be necessary to transport the product from the upstream machine 16 to the downstream machine 18 more quickly so as to prevent the conveyor from filling up before the downstream machine 18 has had a chance to reach the target speed set by the controller 40. As shown in FIG. 1, the programming of the controller 40 may include instructions to generate signals to change the conveyor speed, and/or the speed of the upstream processing equipment, and/or the speed of the downstream processing equipment in response to the comparison of the real-time modeled backlog level and the backlog set point to allow the real-time backlog level to stay close to the backlog set point during steady state operation regardless of the speed of the conveyor.

In the exemplary implementation of the control system as discussed above and shown in FIGS. 1-4, the control system is configured to generate an array to represent products as they travel on the conveyor from the upstream processing equipment to the downstream processing equipment and in general from one machine to another. The control system generates signals to change the conveyor speed, and/or the speed of the upstream processing equipment, and/or the speed of the downstream processing equipment in response to the comparison of the real-time modeled backlog level and the backlog set point. The system relies on feedback and the model within the controller, and via a PID control, responds to changes in backlog to allow the real-time backlog level to stay close to the backlog set point during steady state operation. Changes in backlog can occur due to any changes in the speed of the upstream processing equipment which can cause the product to be more or less densely accumulated on the conveyor. In order for the control system to effect a change in the speed of the upstream processing equipment, conveyor and/or downstream equipment, the level of accumulation in queue of the downstream processing equipment must change by a certain threshold level, which may be set within the PID control. While this is an effective method of control, there is an inherent delay in the response of the control system due to the nature of the feedback control and the tuning and threshold levels set within the PID control. The delay may result in a need for a longer conveyor to accommodate the backlog, and/or more starts and stops on the upstream and/or downstream processing equipment.

Figure 5:
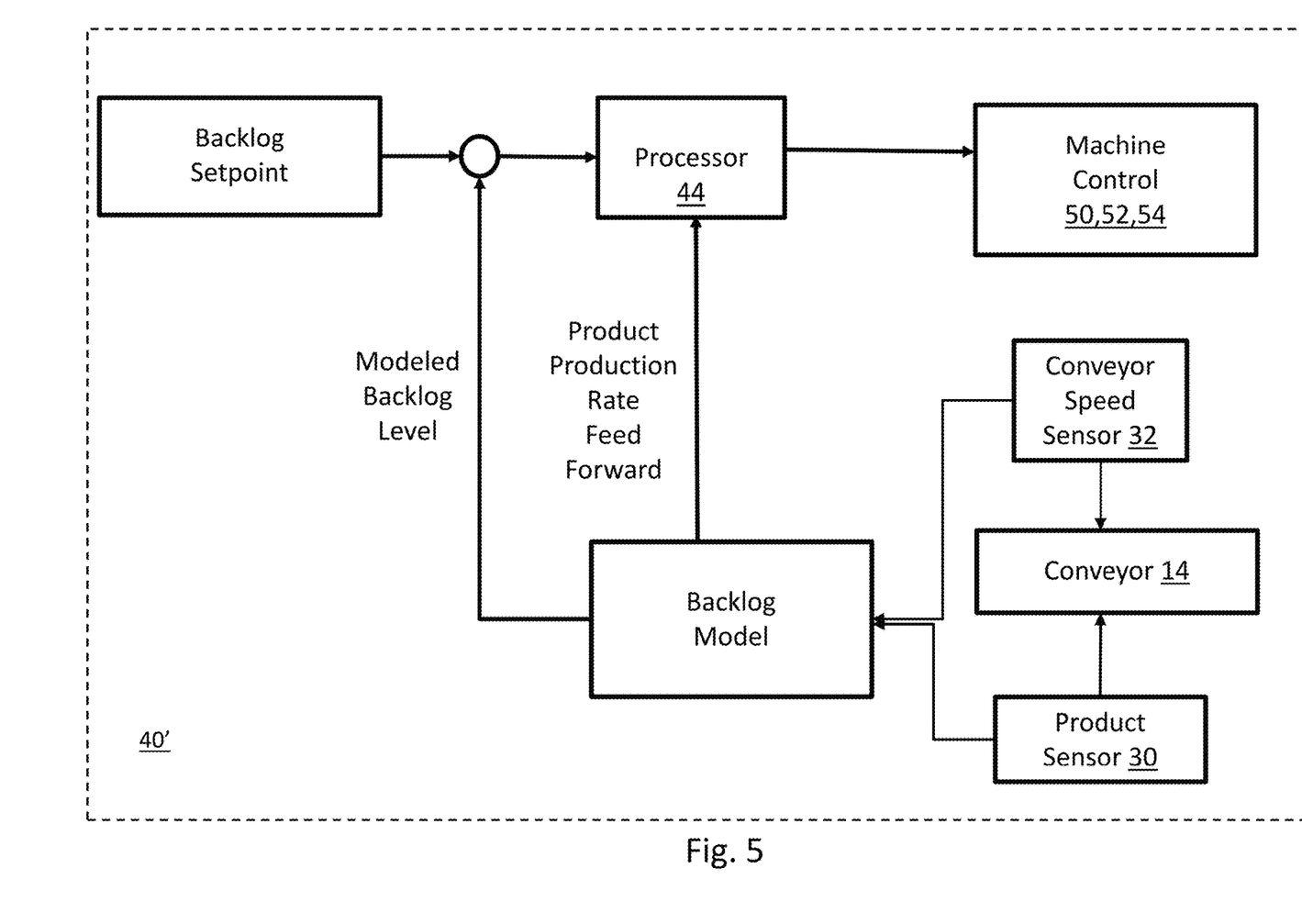
FIG. 5 is an exemplary schematic diagram showing data acquisition and process flow for the controller of the control system of the processing line with a feed forward control arrangement.

To avoid the delay, a feed forward system of control 40' shown schematically in FIG. 5 may be used in conjunction with a feedback based system and model and PID control as discussed above. The feed forward control 40' may utilize certain elements of the control discussed above. For instance, the controller may be programmed with a modeled backlog level based upon the requirements of the machine which the conveyor is feeding. By way of example, and not in any limiting sense, the modeled backlog level may correspond or be representative of a simulated array of products on a section of the conveyor adjacent the in-feed of a downstream machine. The simulated array may correspond or be representative of product arranged side-to-side or end-to-end on the conveyor with no gaps between the products.

Figure 6:
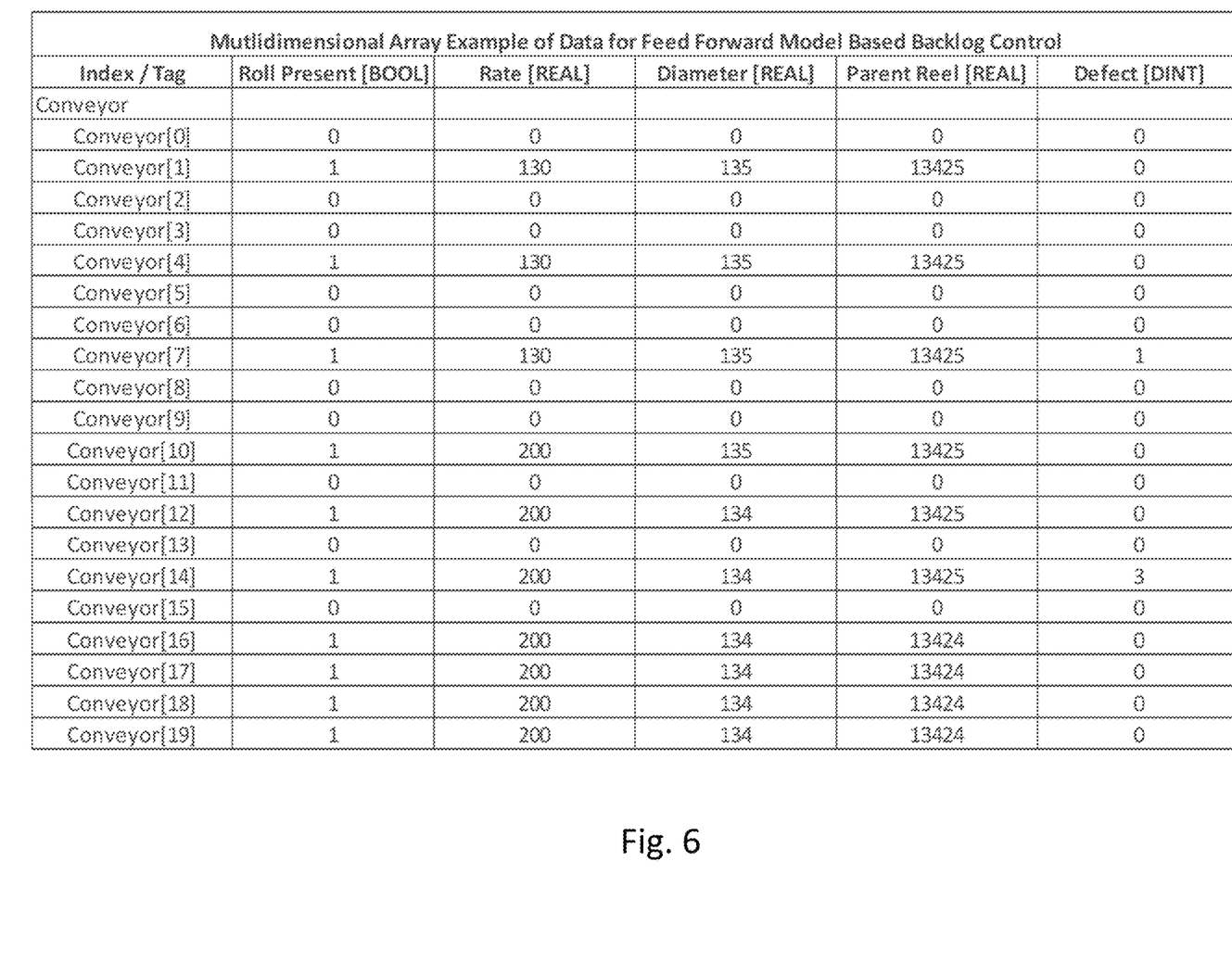
FIG. 6 shows an example of a multi-dimensional array for a feed forward control system of the processing line.
Figure 7:
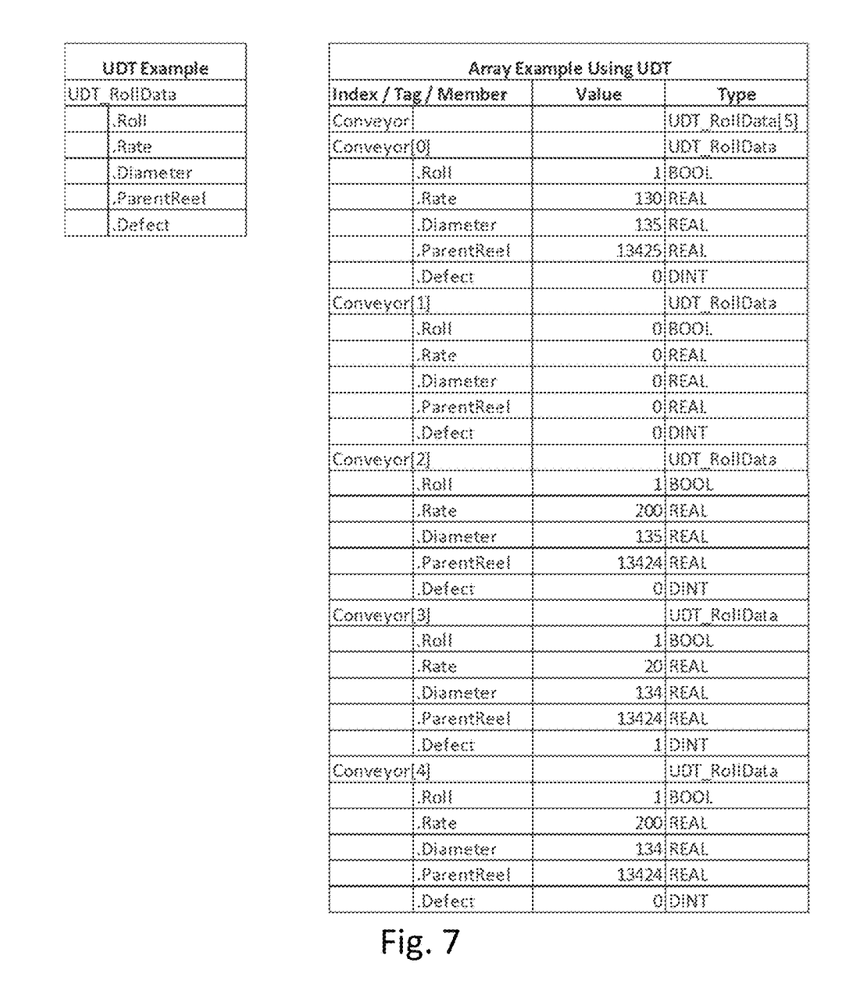
FIG. 7 shows an example of a user-defined type used for a feed forward control system of the processing line.

During operation, sensors 30 associated with the upstream processing equipment 16 may be configured to sense the rate of processing of the product on the upstream processing equipment and send corresponding signals to the controller 40'. Thie signals may be representative of a number of the product type moving on the conveyor 14 from the upstream processing equipment 16 for delivery to the downstream processing equipment 18. The controller 40' may be configured to generate in real time a multi-dimensional array or user-defined type (UDT) for each product type that is being processing in the upstream processing equipment 16, examples of which are shown in FIGS. 6-7. The baseline information in the multi-dimensional array or UDT may include the rate or speed at which the product was created or processed on the upstream processing equipment and the product type. The information in the multi-dimensional array or UDT may also include additional product information, product dimensions (e.g., diameter, length), production rate, and quality characteristics and defect status of the material forming the product (e.g., parent roll dimensions, caliper, known defects in web), the presence of the product on an infeed of the conveyor. By way of example, using the baseline rate or speed at which the product was processed by the upstream processing equipment and at least one characteristic of the product from the product information, which may be arranged in the multi-dimensional array or the UDT, the controller 40' may generate signals to control the downstream processing equipment 18 so the rate of processing of the product in the downstream processing equipment 18 matches the rate of processing in the upstream processing equipment 16. In other words, the controller 40' may be configured to determine a backlog measurement based upon the signals representative of the number of the product type moving onto the conveyor 14 and the signals representative of the conveyor speed, and then compare the backlog measurement to the backlog set point to determine a difference in backlog. Based on the difference, the controller 40' may be adapted and configured to control at least one of the upstream processing equipment 16, the downstream processing equipment 18 and the conveyor 14. The controller 40' may also be configured to control at least one of the upstream processing equipment 16, the downstream processing equipment 18, and the conveyor 14 based on information contained or stored in the multi-dimensional array or the UDT. For instance, the controller 40' may be programmed with instructions to develop a real time delivery array for the products being processed on the upstream processing equipment. The controller 40' may be configured to compare the real time delivery array with the modeled backlog. The controller 40' may be programmed with instructions to compare the rate of shift of the real time delivery array with the modeled backlog. Based on differences, the controller 40' may be programmed to adjust the speed(s) of the upstream machine 16, the conveyor 14, and/or the downstream machine 18 accordingly.

The controller 40' may send additional signals to the downstream equipment 18 corresponding to the additional information contained in the multi-dimensional array or UDT. The information may be used to control the downstream equipment to enhance quality, improve efficiency and operation of the downstream processing equipment, and reduce set-up and change-over time between processing different product formats. The information may also be used for tracking specific product information for better product and performance analysis, and maintenance of equipment. With the feed forward control and use of a multi-dimensional array and UDT, the feed forward method of control can then result in the shortest possible conveyor lengths.

While various embodiments have been described above, it should be understood that they have been presented by way of example only, and not limitation. Thus, the breadth and scope of a preferred embodiment should not be limited by any of the above-described exemplary embodiments.

What is claimed is:

1. A method of controlling a processing line, wherein the processing line includes a conveyor adapted and configured to convey a product type from upstream processing equipment upstream of the conveyor to downstream processing equipment downstream of the conveyor, the method comprising:

storing a plurality of data structures in a memory of a controller of a control system of the processing line, the data structures comprising a plurality of data items associated together as a backlog set point and the product type, the backlog set point being representative of the product type to be processed on the processing line;

generating signals representative of a number of the product type moving onto the conveyor from the upstream processing equipment for delivery to the downstream processing equipment;

storing additional data structures in the memory of the controller, the additional data structures being associated with the product type moving onto the conveyor from the upstream processing equipment, the additional data structures including data based at least in part upon the generated signals representative of the number of the product type moving onto the conveyor from the upstream processing equipment for delivery to the downstream processing equipment, and at least one of a presence of the product type on the conveyor, a production rate of the product type, a dimension of the product type, a material comprising the product type, and a defect status of the material comprising the product type;

generating signals representative of a speed of the conveyor;

determining a backlog measurement based upon the signals representative of the number of the product type moving onto the conveyor and the signals representative of the conveyor speed;

comparing the backlog measurement to the backlog set point to determine a difference in backlog; and enabling the controller to generate signals for controlling the processing line based upon the difference in backlog, and at least one of the presence of the product type on the conveyor, the production rate of the product type, the dimension of the product type, the material comprising the product type, and the defect status of the material comprising the product type.

2. The method of claim 1 further comprising:
enabling the controller to generate a signal to change a speed of the conveyor based upon the difference in backlog, and at least one of the presence of the product type on the conveyor, the production rate of the product type, the dimension of the product type, the material comprising the product type, and the defect status of the material comprising the product type.

3. The method of claim 1 further comprising:
enabling the controller to generate a signal to change operation of the upstream processing equipment based upon the difference in backlog, and at least one of the presence of the product type on the conveyor, the production rate of the product type, the dimension of the product type, the material comprising the product type, and the defect status of the material comprising the product type.

4. The method of claim 1 further comprising:
enabling the controller to generate a signal to change operation of the downstream processing equipment based upon the difference in backlog, and at least one of the presence of the product type on the conveyor, the production rate of the product type, the dimension of the product type, the material comprising the product type, and the defect status of the material comprising the product type.

5. The method of claim 1 further comprising:
establishing an orientation of the product type being conveyed on the conveyor;

determining an array of the product type being conveyed on the conveyor based upon the dimension of the product type and a conveyor length; and structuring the plurality of data structures stored in the memory of the controller of the control system for the processing line with data representative of the array wherein the backlog set point is based in part upon the array.

6. The method of claim 1 wherein the product type being conveyed comprises a cylindrical roll, and the dimension of the product type comprises an axial length of the roll.

7. The method of claim 1 wherein the product type being conveyed comprises a cylindrical roll, and the dimension of the product type comprises a diameter of the roll.

8. The method of claim 1 wherein the product type being conveyed comprises a rectangular form, and the dimension the product type comprises a length of a side of the rectangular form.

9. The method of claim 1 wherein the downstream processing equipment comprises one of a wrapping station, an accumulator, a bundler, a case packer, and a palletizer; and the step of enabling the controller to generate signals for controlling the processing line based upon the difference in backlog includes controlling operation of the downstream processing equipment based upon the difference in backlog.

10. The method of claim 1 wherein the upstream processing equipment comprises one of a saw cutting operation, an accumulator, a bundler, a wrapping station, and a case packer; and the step of enabling the controller to generate signals for controlling the processing line based upon the difference in backlog includes controlling operation of the upstream processing equipment based upon the difference in backlog.

11. The method of claim 1 wherein the step of storing the additional data structures in the memory of the controller includes storing the additional data structures in the memory of the controller as at least one multi-dimensional array, the at least one multi-dimensional array comprising data based on at least in part upon: (i) the generated signals representative of the number of the product type moving onto the conveyor from the upstream processing equipment for delivery to the downstream processing equipment, and (ii) at least one of a presence of the product type on the conveyor, a production rate of the product type, a dimension of the product type, a material comprising the product type, and a defect status of the material comprising the product type.

12. The method of claim 1 wherein the step of storing the additional data structures in the memory of the controller includes storing the additional data structures in the memory of the controller as at least one user defined type, the at least one user defined type comprising data based on at least in part upon: (i) the generated signals representative of the number of the product type moving onto the conveyor from the upstream processing equipment for delivery to the downstream processing equipment, and (ii) at least one of a presence of the product type on the conveyor, a production rate of the product type, a dimension of the product type, a material comprising the product type, and a defect status of the material comprising the product type.

13. A control system for a processing line, wherein the processing line includes a conveyor adapted and configured to convey a product type from upstream processing equipment upstream of the conveyor to downstream processing equipment downstream of the conveyor, the control system comprising:

a product sensor, the product sensor being adapted and configured to generate signals representative of a number of the product type moving on the conveyor from the upstream processing equipment for delivery to the downstream processing equipment;

a conveyor speed sensor for the conveyor, the conveyor speed sensor being adapted and configured to generate signals representative of a speed of the conveyor; and a controller including a processor and memory, the controller being adapted and configured to: (i) process information representative of a backlog set point and a product type, the backlog set point being representative of the product type to be processed on the processing line; (ii) store a plurality of data structures in the memory of the controller of the control system, wherein the data structures include a plurality of data items associated together as the backlog set point and the product type; (iii) store additional data structures in the memory of the controller, the additional data structures being associated with the product type moving onto the conveyor from the upstream processing equipment, the additional data structures including data based at least in part upon the generated signals representative of the number of the product type moving onto the conveyor from the upstream processing equipment for delivery to the downstream processing equipment, and at least one of a presence of the product type on the conveyor, a production rate of the product type, a dimension of the product type, a material comprising the product type, and a defect status of the material comprising the product type; (iv) determine a backlog measurement for the conveyor based upon the product sensor signals and the conveyor speed sensor signals; (v) compare the backlog measurement to the backlog set point to determine a difference in backlog; and (vi) generate signals for controlling the processing line based upon the difference in backlog, and at least one of the presence of the product type on the conveyor, the production rate of the product type, the dimension of the product type, the material comprising the product type, and the defect status of the material comprising the product type.

14. The control system of claim 13 wherein the controller is adapted and configured to generate a signal to change a speed of the conveyor based upon the difference in backlog, and at least one of the presence of the product type on the conveyor, the production rate of the product type, the dimension of the product type, the material comprising the product type, and the defect status of the material comprising the product type.

15. The control system of claim 13 wherein the controller is adapted and configured to generate a signal to change operation of the upstream processing equipment based upon the difference in backlog, and at least one of the presence of the product type on the conveyor, the production rate of the product type, the dimension of the product type, the material comprising the product type, and the defect status of the material comprising the product type.

16. The control system of claim 13 wherein the controller is adapted and configured to generate a signal to change operation of the downstream processing equipment based upon the difference in backlog, and at least one of the presence of the product type on the conveyor, the production rate of the product type, the dimension of the product type, the material comprising the product type, and the defect status of the material comprising the product type.

17. The control system of claim 13 wherein the controller is adapted and configured to: (vii) process information indicative of an orientation of the product type being conveyed on the conveyor and a dimensional size of the product type in the orientation; (viii) process information indicative of an array of the product type being conveyed on the conveyor based upon a dimensional size of the product type and a conveyor length; and (ix) store a plurality of data structures in the memory of the controller of the control system for the processing line that include data representative of the array; wherein the backlog set point is based in part upon the array.

18. The control system of claim 13 wherein the product type being conveyed comprises a cylindrical roll, and the controller is adapted and configured to process information representative of an axial length of the roll.

19. The control system of claim 13 wherein the product type being conveyed comprises a cylindrical roll, and the controller is adapted and configured to process information representative of a diameter of the roll.

20. The control system of claim 13 wherein the product being conveyed comprises a rectangular form, and the controller is adapted and configured to process information representative of a length of a side of the rectangular form.

21. The control system of claim 13 wherein the controller is adapted and configured to generate signals for controlling operation of one of a wrapping station, an accumulator, a bundler, a case packer, and a palletizer downstream of the conveyor based upon the difference in backlog.

22. The control system of claim 13 wherein the controller is adapted and configured to generate signals for controlling operation one of a saw cutting operation, an accumulator, a wrapping station, a bundler, and a case packer upstream of the conveyor based upon the difference in backlog.

23. The control system of claim 13 wherein the additional data structures include at least one multi-dimensional array, the at least one multi-dimensional array comprising data based on at least in part upon: (i) the generated signals representative of the number of the product type moving onto the conveyor from the upstream processing equipment for delivery to the downstream processing equipment, and (ii) at least one of a presence of the product type on the conveyor, a production rate of the product type, a dimension of the product type, a material comprising the product type, and a defect status of the material comprising the product type.

24. The control system of claim 13 wherein the additional data structures include at least one user defined type, the at least one user defined type comprising data based on at least in part upon: (i) the generated signals representative of the number of the product type moving onto the conveyor from the upstream processing equipment for delivery to the downstream processing equipment, and (ii) at least one of a presence of the product type on the conveyor, a production rate of the product type, a dimension of the product type, a material comprising the product type, and a defect status of the material comprising the product type.

* * * * *